3,153,155
SOLID STATE IGNITOR EMPLOYING INVERTER
CIRCUIT TO DRIVE FIRING CIRCUIT
William N. Scott, Grosse Pointe Woods, Mich., assignor to Rett Electronics, Inc., Warren, Mich., a corporation of Michigan
Filed Oct. 4, 1962, Ser. No. 228,459
7 Claims. (Cl. 307—88.5)

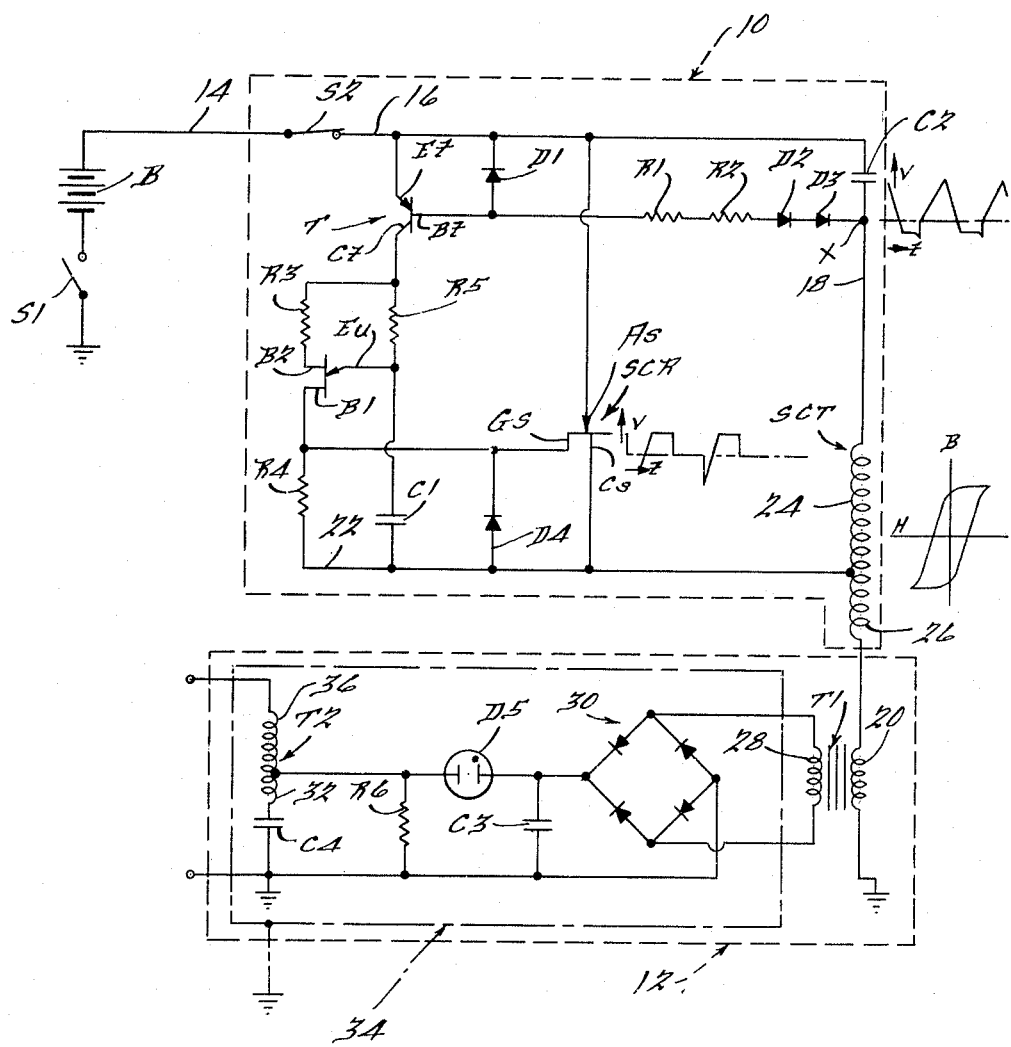

This invention relates to fuel ignitors and more particularly to a solid state fuel ignitor.

In diesel and jet engines ignition of the fuel can be initially caused by a high voltage electrical discharge across the electrodes of an ignitor plug. In conventional practice the ignitor plug receives its energy from an electrical circuit whereby the battery voltage of the vehicle or system is inverted by means of a mechanical vibrator and the resulting alternating voltage is stepped up in magnitude, e.g., to 3000 volts. The alternating voltage is then converted into a direct voltage pulse of high magnitude to fire the ignitor plug. This type of system is capable only of intermittent operation, since the mechanical components utilized, i.e., vibrator contacts, etc., would eventually be destroyed under continuous operation. It is an object, therefore, of this invention to provide a solid state ignitor circuit which is capable of continuous operation without self-destruction.

In some instances it is possible that an engine of the type utilizing an ignitor is to be started under severely varying temperatures, i.e., from −55° F. to 160° F. Therefore, it is an object of this invention to provide an ignitor system of the above-described type capable of operation over an extreme temperature range.

For engines used under severely varying temperature conditions, i.e., from −55° F. to +160° F., it is possible for the direct voltage power supply for a 24-volt system, for example, to vary in potential from 10 volts to 30 volts. It is an object of this invention to provide a solid state ignitor system which is capable of delivering to the ignitor plug a sufficient output to start the engine over an extreme range in operating temperatures. It is a further object of this invention to provide a solid state ignitor circuit which is operable over a substantial range in potential of the battery or source.

Other objects, features, and advantages of the present invention will become apparent from the subsequent description and the appended claims, taken in conjunction with the accompanying drawing, in which the drawing depicts an electrical schematic diagram of a circuit embodying the features of this invention.

In general, the circuit in the drawing comprises an inverter circuit, indicated by the numeral 10, which changes direct voltage into a substantially high potential alternating voltage which in turn is fed into a high voltage firing circuit, generally indicated by the numeral 12. In the firing circuit 12 the alternating voltage output from inverter circuit 10 is rectified and used to build up a charge on an energy storage device. When a sufficiently high potential is attained, the storage device is caused to discharge across the electrodes of an ignitor plug (not shown); in a particular application, a discharge output voltage of approximately 30 to 50 kv. at an energy level of approximately .8 joule is attained.

Considering first the inverter circuit 10, it includes an output and switching circuit which provides a substantially square wave, pulsating output at a frequency of approximately 20 kc. from a source of direct potential. The output and switching circuit is used in conjunction with a trigger oscillator circuit which provides a trigger signal for initiating its actuation. Once actuated, the output and switching circuit continues to conduct until it is extinguished. An oscillator control circuit is provided to switch the trigger oscillator circuit "on" or "off" in response to the pulsating output from the output and switching circuit while the output and switching circuit has means responsive to the pulsating output for extinguishing itself and being placed in a condition to again conduct in response to a trigger signal. Thus the output and switching circuit continuously alternates between "on" and "off" conditions resulting in a pulsating output.

More specifically now and looking to the inverter circuit 10 of the figure, a source of direct potential indicated by the battery B has its negative end connected to ground via an actuating switch S1 and has its positive end connected to an input conductor 14 which is serially connected to one side of a thermal overload switch S2. The switch S2 is of a conventional construction and automatically interrupts the circuit of the conductor 14 in response to an overload current, thereby protecting the succeeding circuitry. The opposite side of switch S2 is connected to a conductor 16 which is in turn connected to an emitter electrode E$t$ of a junction-type transistor T which also includes base and collector electrodes B$t$ and C$t$, respectively. A diode D1 has its anode connected to the base B$t$ and has its cathode connected to the emitter E$t$. Serially connected with the base B$t$ is a dropping resistor R1, a thermal resistor or thermistor R2 and a pair of diodes D2 and D3, with the anodes of diodes D2 and D3 connected toward the base B$t$ of transistor T. A conductor 18 is connected to the cathode of diode D3 and provides a path to ground for the base B$t$ through the coil of a saturable current transformer SCT and through the primary winding 20 of a transformer T1. Thus the transformer SCT is connected to ground via the primary winding 20 of transformer T1.

With the switch S1 closed, the emitter E$t$ is maintained positive relative to the base B$t$ whereby control current current then can flow from the battery B through the emitter and base circuit of transistor T through the resistors R1 and R2, the diodes D2 and D3, through conductor 18, through the saturable current transformer SCT and through the primary 20 of transformer T1 to ground. In this condition then the transistor T is biased "on" whereby output current can then flow from battery B to the collector C$t$ through emitter E$t$; this ouput current actuates a trigger oscillator circuit which includes a unijunction transistor UJT which has two base electrodes B1 and B2 and an emitter electrode E$u$. A resistor R3 is connected from base B2 to the collector C$t$ of transistor T while a resistor R4 is connected from the base B1 to a conductor 22 which is connected at a point between portions 24 and 26 of the windings of saturable current transformer SCT. The resistors R3, R4 and the resistance of bases B1 and B2 act as a voltage divided in a manner to be presently seen. A capacitor C1 is connected between the emitter E2 of the unijunction transistor UJT and conductor 22 while a charging resistor R5 for C1 is connected betwen the collector C$t$ of transistor T and the emitter E$u$ of the unijunction transistor UJT. The unijunction transistor UJT and its associated circuitry operates as a simple relaxation oscillator such that with the transistor T in an "on" condition the potential of battery B essentially appears at the collector C$t$, and current is conducted through the emitter E$t$ and collector C$t$ and flows through charging resistor R5 to initially build up a charge upon capacitor C1 with the charge rate essentially determined by the values of R5 and C1. At the same time with the transistor T in an "on" condition, the potential of the battery B is essentially imposed across the resistor series circuit comprising the resistor R3, the base B2, the base B1 and the resistor R4. As the potential across the capacitor C1 increases and becomes greater than the potential across the base B1 and resistor R4, current will begin to flow from the emitter Eu to the base B1 and resistor R4. In accordance with the characteristics of the unijunction transistor UJT, the resistance of the base B1 decreases with an increase in current flow therethrough, thus providing a discharge path for the capacitor C1. With the reduction in resistance of the base B1 and with the discharge current from C1, the potential across R4 increases, providing a trigger signal which serves a purpose to be described. After the capacitor C1 has substantially discharged, the potential across R4 and hence at the base B1 will be at a magnitude whereby the unijunction transistor UJT is no longer forwardly biased, whereupon conduction through the emitter Eu to the base B1 ceases. The cycle then repeats itself as the capacitor C1 is again recharged. The cycle will continue to repeat as long as the transistor T is in an "on" or conductive condition. A diode D4 has its anode connected to the conductor 22 and its cathode connected to the base B1 of the unijunction transistor UJT and serves a purpose to be later described.

A silicon controlled rectifier SCR having anode, cathode and gate electrodes As, Cs and Gs, respectively, is utilized to conduct current from the battery B to the output. The silicon controlled rectifier SCR is a valve of a type similar in operation to a gas tube thyratron wherein the firing or conduction of the silicon controlled rectifier is initiated by means of current flow exceeding a minimum value through the gate and cathode electrodes; at this time a positive potential applied between the anode and cathode electrodes will cause current flow between the anode and cathode. Thereafter the latter current will flow continuously regardless of the condition of the gate as long as the anode is positive relative to the cathode. The silicon controlled rectifier SCR can be extinguished only by driving the cathode to a potential substantially equal to or more positive than the potential of the anode whereupon the gate again will regain control of the firing.

In the inverter circuit 10 of the figure, the anode As of the silicon controlled rectifier SCR is connected to the positive side of battery B via the conductor 16 while the cathode Cs is connected to ground via the conductor 22, the portion of the windings 26 of the saturable current transformer SCT and the secondary winding 20 of the transformer T1. The gate electrode Gs is connected directly to the resistor R4 and the base B1 of the unijunction transistor UJT.

With the transistor T in an "on" condition whereby the unijunction transistor UJT is switched on and into oscillation, a trigger pulse appears at the gate Gs of the silicon controlled rectifier SCR via the resistor R4. The trigger pulse causes current to flow from the gate Gs to cathode Cs whereby the silicon controlled rectifier SCR is placed in a conductive state. Thus a single cycle of the unijunction transistor UJT whereby the potential across the resistor R4 is increased provides a trigger pulse for the rectifier SCR. Since the anode As of rectifier SCR is normally biased positively relative to the cathode Cs and with the rectifier SCR in the conductive state as a result of a trigger pulse from the unijunction transistor UJT, current conduction is initiated from battery B through the anode As to the cathode Cs of rectifier SCR and thence through conductor 22, through the portion 26 of the saturable current transformer SCT, through the primary 20 of the transformer T1 to ground. However, as previously mentioned, with the silicon controlled rectifier SCR in the conductive state, further oscillation of the trigger oscillator circuit of the unijunction transformer UJT can no longer affect its conductive condition. In order that an alternating current be applied to the primary 20 of the transformer T1, it is required that the silicon controlled rectifier SCR be switched off periodically in order that the circuit of the gate Gs and cathode Cs can again regain control of its conduction. This switching is effectuated by means of the saturable current transformer SCT and by means of a capacitor C2 which has one side connected to the conductor 16 and its other side connected to the junction X between the conductor 18 and the cathode of diode D3.

The saturable current transformer SCT has a square loop core, i.e., having a "square"-shaped hysteresis loop indicated by the B-H curve shown in the drawing. Initially in the operation of the inverter circuit 10, the point X is at zero or at a slightly negative potential such that when the rectifier SCR is actuated by the trigger oscillator circuit of the unijunction transistor UJT the potential of source B appears across the winding portion 24 of the transformer SCT via the conductor 22, thereby quickly driving the core of the transformer SCT to negative saturation. With the core saturated, the inductive reactance of the transformer SCT drops, thereby permitting the capacitor C2 to charge rapidly toward the potential of source B. Meanwhile, the load current through the other winding portion 26 of the transformer SCT to the secondary 20 of the transformer T1 drives the core of the transformer SCT to positive saturation. Between negative and positive saturation the core of the transformer SCT acts as a transformer whereby the capacitor C2 is charged (at the point X) to a potential above the potential of the source B. When positive saturation of the core of the transformer SCT is reached, the winding portions 24 and 26 become a short circuit, thereby allowing the capacitor C2 to discharge. With the charge on capacitor C2 prior to discharge exceeding the potential at anode As, a reverse current is caused to flow through the silicon controlled rectifier SCR, i.e., through the cathode Cs to the anode As. By placing the cathode Cs at a potential more positive than the anode As, conduction of the rectifier SCR is interrupted, again placing control of the rectifier SCR in the gate-cathode circuit. Thus transformer SCT and capacitor C2 provide a control signal to extinguish the rectifier SCR. Note that with the potential at the point X above the supply potential of source B, the bias in the base-emitter circuit of the transistor T is reversed, thereby terminating conduction off that transistor. Thus the control signal also cuts off the transistor T. As previously mentioned, with the transistor T in an "off" condition, oscillation of trigger oscillator circuit of the unijunction transistor UJT is interrupted. With the capacitor C3 substantially discharged and with the silicon controlled rectifier SCR extinguished, the inverter circuit 10 is again in a condition to repeat the sequence previously described. Thus the transistor T tends to synchronize the oscillation of the circuitry of unijunction transistor UJT with the switching of rectifier SCR by transformer SCT. Essentially, by selecting the value of C2 the frequency of switching of the rectifier SCR can be set at a desired level. In one application of the embodiment as shown in FIGURE 1, switching was provided to occur at 20 kc.

The potential variations at the point X can be seen in the graph located adjacent point X on the drawing, while the potential variations across the rectifier SCR are shown adjacent rectifier SCR. By looking at the curve of the potential variations across the rectifier SCR, it can be seen that the output to the primary 20 of transformer T1 is substantially a square wave.

The diodes D2 and D3 provide a high impedance path for reverse current therethrough as a result of the reverse bias imposed on base Bt by the high potential at the point X. The diode D1 provides a low impedance path for reverse current through diodes D2, D3, thereby protecting the base-emitter circuit of the transistor T. Two diodes D2 and D3 were used since it was found that if one diode were used alone a heat sink would have to be employed to dissipate the heat as a result of the reverse current therethrough. The resistor R2 has a negative coefficient of resistance and provides for temperature compensation of the transistor T, thereby insuring proper operation over a wide temperature range. The diode D4 provides a low impedance path for negative pulses in the gate-cathode circuit of the rectifier SCR. The diode D4 also prevents the potential across R4, i.e., from base B1 to conductor 22, from dropping to a level, allowing the unijunction transistor UJT to conduct prematurely, thereby improperly triggering the rectifier SCR.

The frequency of oscillation of the relaxation oscillator circuit of the transistor UJT is not critical. It is selected to be at a higher frequency than the desired switching frequency of the rectifier SCR to insure proper triggering of the SCR.

Summarizing, in general, the operation of the inverter circuit 10, a trigger pulse from the trigger oscillator circuit initiates conduction of the rectifier SCR. The initial conduction of the rectifier SCR forms the leading edge of what eventually will be a potential pulse of a pulsating output. This leading edge of the output from rectifier SCR as a result of the action of the transformer SCT and capacitor C2 causes a control signal to be generated. The control signal switches the rectifier SCR "off" thereby providing for a pulsed output therefrom and also switches transistor T1 in the oscillator control circuit "off" thereby interrupting oscillation of the trigger oscillator circuit including unijunction tansistor UJT. With the rectifier SCR "off" and with the control signal no longer present, the cycle will then be repeated.

The transformer T1 previously referred to is a part of the high voltage firing circuit 12 and acts as a means for coupling the pulsating output from the inverter circuit 10 into the remainder of the high voltage firing circuit 12. As a result of the pulsating output potential fed to primary 20 of transformer T1 as the rectifier SCR is alternately rendered conductive and nonconductive, an alternating potential of high magnitude is induced into the secondary winding 28. The alternating voltage at the secondary winding 28 is impressed across the input circuit of a rectifier bridge 30, the output of which is connected across a storage capacitor C3 which has one side connected to ground. A gas diode D5 is connected between the positive side of capacitor C3 and the positive side of a resistor R6 which has its opposite side connected to ground. The positive side of the resistor R6 is connected between portions 32 and 36 of a winding of an autotransformer T2. The opposite side of portion 32 is connected to ground via a capacitor C4. The output from the high voltage firing circuit 12 is taken across the free end of portion 36 of autotransformer T2 to ground.

In operation, the pulsating output from the inverter circuit 10 is applied to the primary winding 20 of transformer T1 and stepped up in magnitude; the stepped-up potential is rectified via the rectifier bridge 30 and a charge is gradually built up on the capacitor C3. When the potential energy stored upon the capacitor C3 reaches a predetermined level, diode D5 breaks down providing substantially a short circuit path for discharge current to the portion 32 of the autotransformer T2, to the capacitor C4 and thence to ground. The portion 32 of autotransformer T2 and the capacitor C4 act as a resonant or tuned circuit, thereby providing for current flow of a high magnitude, resulting in a substantial stepup in the output voltage as a result of the autotransformer action of the transformer T2. This increased potential appearing in the output is applied to the electrodes of an ignitor plug (not shown), resulting in an arc thereacross. The bleeder resistor R6 provides a path to ground for the low frequency component of the pulse transmitted through diode D5.

As previously noted, by changing the value of the capacitor C2, the switching frequency of the rectifier SCR can be altered, thereby altering the pulse width of the output applied to the primary 20 of the transformer T1. It is desirable that the ignitor plug be actuated over a wide potential range whereby variations in potential of battery B will not prevent firing. In the circuit as shown and described, as the potential of the battery B decreases, i.e., as under subzero temperature conditions, the magnitude of the current pulses to the primary 20 of the transformer T1 decrease, thereby requiring more pulses to charge the capacitor C3 to the proper level to discharge through the diode D5. As the potential of battery B increases, the magnitude of the current pulses increases, thereby decreasing the number of pulses required to charge capacitor C3 to the proper level. With the circuit as shown and described for use with a 24-volt system, variations in the potential of the battery B in the range of from 10 to 30 volts result in a variation in the number of output pulses to the ignitor plug from 3 to 25 pulses per second. The latter pulse-rate range has been found to be adequate to start a diesel engine.

For radio suppression purposes, substantially the entire high voltage firing circuit 12, excluding transformer T1, is surrounded by a shield 34 which is connected to ground.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. An ignitor circuit for providing a high potential output pulse from a source of D.-C. potential comprising: inverter circuit means for providing a pulsating output signal from the D.-C. potential of the source and high voltage firing circuit means electrically connected to said inverter circuit means and responsive to a plurality of cycles of said pulsating output for providing the output pulse, said inverter circuit means comprising output and switching circuit means electrically connected to the source and actuable responsively to a trigger signal for providing said pulsating output, trigger oscillator circuit means for generating said trigger signal and electrically connected to said output and switching circuit means for applying said trigger signal to said output and switching circuit means, and oscillator control circuit means electrically connected to said output and switching circuit means and to said trigger oscillator circuit means and having one conductive condition preventing oscillation of said trigger oscillator circuit means and having another conductive condition initiating oscillation of said trigger oscillator circuit means with said oscillator control circuit means alternating between said one and another conductive condition responsively to said pulsating output.

2. An ignitor circuit for providing a high potential output pulse from a source of D.-C. potential comprising: inverter circuit means for providing a pulsating output signal from the D.-C. potential of the source and high voltage firing circuit means electrically connected to said inverter circuit means and responsive to a plurality of cycles of said pulsating output for providing the output pulse, said inverter circuit means comprising output and switching circuit means electrically connected to the source and actuable responsively to a trigger signal for providing said pulsating output, trigger oscillator circuit means for generating said trigger signal and electrically connected to said output and switching circuit means for applying said trigger signal to said output and switching circuit means, oscillator control circuit means electrically connected to said output and switching circuit means and to said trigger oscillator circuit means and having one conductive condition preventing oscillation of said trigger oscillator circuit means and having another conductive condition initiating oscillation of said trigger oscillator circuit means with said oscillator control circuit means alternating between said one and another conductive condition responsively to said pulsating output, said high voltage firing means including energy storage means for storing an electrical charge, charge circuit means for charging said energy storage means responsively to said pulsating output, and discharge circuit means for discharging said energy storage means responsively to a charge thereon of a preselected magnitude and for providing the high potential output pulse.

3. An ignitor circuit for providing a high potential output pulse from a source of D.-C. potential comprising: inverter circuit means for providing a pulsating output from the D.-C. potential of the source and high voltage firing circuit means electrically connected to said inverter circuit means and responsive to a plurality of cycles of said pulsating output for providing the output pulse, said inverter circuit means comprising output and switching circuit means electrically connected to the source and actuable responsively to a trigger signal for providing said pulsating output, said output and switching means including asymmetric current means and switch means for conducting current from the source and for generating said pulsating output, said asymmetric current means including a normally opened output circuit electrically connected to the source for conducting current therefrom upon being closed and for being opened responsively to a control signal and further including an input circuit for closing said output circuit responsively to said trigger signal, said switch means being responsive to said pulsating output for generating said control signal for opening said output circuit, and trigger oscillator circuit means for generating said trigger signal and electrically connected to said output and switching circuit means for applying said trigger signal to said output and switching circuit means, said high voltage firing means including energy storage means for storing an electrical charge, charge circuit means for charging said energy storage means responsively to said pulsating output, said charge circuit means including coupling means for converting said pulsating output into an alternating output potential and rectifier means electrically connected to said coupling means for conducting a direct potential output to said energy storage means from said alternating output potential, and discharge circuit means for discharging said energy storage means responsively to a charge thereon of a preselected magnitude and for providing the high potential output pulse, said discharge circuit means including output circuit means for providing the high potential output pulse responsively to an input pulse, asymmetric current means electrically connected to said energy storage means and to said output circuit means for normally providing an open circuit between said energy storage means and said output circuit and for providing a closed circuit to said energy storage means responsively to a charge thereon of said preselected magnitude whereby the discharge of said energy storage means provides said input pulse to said output circuit means, said output circuit means including autotransformer means comprising a tuned circuit for increasing the magnitude of the potential of said input pulse whereby the high potential output pulse is provided.

4. An ignitor circuit for providing a high potential output pulse from a source of D.-C. potential comprising: inverter circuit means for providing a pulsating output from the D.-C. potential of the source and high voltage firing circuit means electrically connected to said inverter circuit means and responsive to a plurality of cycles of said pulsating output for providing the output pulse, said inverter circuit means comprising output and switching circuit means electrically connected to the source and actuable responsively to a trigger signal for providing said pulsating output, said output and switching means including asymmetric current means and switch means for conducting current from the source and for generating said pulsating output, said asymmetric current means including a normally opened output circuit electrically connected to the source for conducting current therefrom upon being closed and for being opened responsively to a control signal and further including an input circuit for closing said output circuit responsively to said trigger signal, said switch means being responsive to said pulsating output for generating said control signal for opening said output circuit, said switch means including a square core saturable current transformer, an energy storage device, and circuit means for connecting a portion of the winding of said transformer and said energy storage device across said output circuit of said asymmetric current means, and trigger oscillator circuit means for generating said trigger signal and electrically connected to said output and switching circuit means for applying said trigger signal to said output and switching circuit means.

5. An ignitor circuit for providing a high potential output pulse from a source of D.-C. potential comprising: inverter circuit means for providing a pulsating output from the D.-C. potential of the source and high voltage firing circuit means electrically connected to said inverter circuit means and responsive to a plurality of cycles of said pulsating output for providing the output pulse, said inverter circuit means comprising output and switching circuit means electrically connected to the source and actuable responsively to a trigger signal for providing said pulsating output, said ouput and switching means including asymmetric current means and switch means for conducting current from the source and for generating said pulsating output, said asymmetric current means including a normally opened output circuit electrically connected to the source for conducting current therefrom upon being closed and for being opened responsively to a control signal and further including an input circuit for closing said output circuit responsively to said trigger signal, said switch means being responsive to said pulsating output for generating said control signal for opening said output circuit, said switch means including a square core saturable current transformer, an energy storage device, and circuit means for connecting a portion of the winding of said transformer and said energy storage device across said output circuit of said asymmetric current means, trigger oscillator circuit means for generating said trigger signal and electrically connected to said output and switching circuit means for applying said trigger signal to said output and switching circuit means, and oscillator control circuit means electrically connected to said output and switching circuit means and to said trigger oscillator means and having one conductive condition preventing oscillation of said trigger oscillator circuit means and having another conductive condition initiating oscillation of said trigger oscillator circuit means with said oscillator control circuit means alternating between said one and another conductive conditions responsively to the potential at the junction between said energy storage device and said transformer.

6. An ignitor circuit for providing a high potential output pulse from a source of D.-C. potential comprising: inverter circuit means for providing a pulsating output from the D.-C. potential of the source and high voltage firing circuit means electrically connected to said inverter circuit means and responsive to a plurality of cycles of said pulsating output for providing the output pulse, said inverter circuit means comprising output and switching circuit means electrically connected to the source and actuable responsively to a trigger signal for providing said pulsating output, said output and switching circuit means including a controlled rectifier having anode, cathode, and gate electrodes, a square core saturable current transformer, an energy storage device, and circuit means for electrically connecting a portion of the winding of said transformer and said energy storage device across said anode and said cathode, and trigger oscillator circuit means for generating said trigger signal and electrically connected to said output and switching circuit means for applying said trigger signal to said gate and cathode electrodes of said controlled rectifier, and oscillator control circuit means electrically connected to said output and switching circuit means and to said trigger oscillator means and having one conductive condition preventing oscillation of said trigger oscillator circuit means and having another conductive condition initiating oscillation of said trigger oscillator circuit means with said oscillator control circuit means alternating between said one and another conductive conditions responsively to the potential at the junction between said energy storage device and said transformer.

7. An ignitor circuit for providing a high potential output pulse from a source of D.-C. potential comprising: inverter circuit means for providing a pulsating output from the D.-C. potential of the source and high voltage firing circuit means electrically connected to said inverter circuit means and responsive to a plurality of cycles of said pulsating output for providing the output pulse, said inverter circuit means comprising output and switching circuit means electrically connected to the source and actuable responsively to a trigger signal for providing said pulsating output, said output and switching circuit means including a controlled rectifier having anode, cathode, and gate electrodes, a square core saturable current transformer, an energy storage device, and circuit means for electrically connecting a portion of the winding of said transformer and said energy storage device across said anode and said cathode, trigger oscillator circuit means for generating said trigger signal and electrically connected to said output and switching circuit means for applying said trigger signal to said gate and cathode electrodes of said controlled rectifier in said output and switching circuit means, and oscillator control circuit means electrically connected to said output and switching circuit means and to said trigger oscillator means and having one conductive condition preventing oscillation of said trigger oscillator circuit means and having another conductive condition initiating oscillation of said trigger oscillator circuit means with said oscillator control circuit means alternating between said one and another conductive conditions responsively to the potential at the junction between said energy storage device and said transformer, said high voltage firing means including energy storage means for storing an electrical charge, charge circuit means for charging said energy storage means responsively to said pulsating output, said charge circuit means including coupling means for converting said pulsating output into an alternating output potential and rectifier means electrically connected to said coupling means for conducting a direct potential output to said energy storage means from said alternating output potential, and discharge circuit means for discharging said energy storage means responsively to a charge thereon of a preselected magnitude and for providing the high potential output pulse, said discharge circuit means including output circuit means for providing the high potential output pulse responsively to an input pulse, asymmetric current means electrically connected to said energy storage means and to said output circuit means for normally providing an open circuit between said energy storage means and said output circuit means and for providing a closed circuit to said energy storage means responsively to a charge thereon of said preselected magnitude whereby the discharge of said energy storage means provides said input pulse to said output circuit means.

References Cited in the file of this patent

UNITED STATES PATENTS 3,045,148    McNulty et al. _____ July 17, 1962

OTHER REFERENCES

G.E. Notes on the Application of the Silicon Controlled Rectifier ECG371-1, December 1958, Fig. 10.4, page 56.